United States Patent [19]
Prillinger et al.

[11] 3,927,737
[45] Dec. 23, 1975

[54] ANNULAR DUAL PISTON BRAKE ARRANGEMENT

[75] Inventors: Peter F. M. Prillinger, Peoria Heights; Paul C. Rosenberger, Decatur, both of Ill.

[73] Assignee: Caterpillar Tractor Co., Peoria, Ill.

[22] Filed: Nov. 11, 1974

[21] Appl. No.: 522,390

[52] U.S. Cl. .................. 188/106F; 92/62; 92/63; 188/71.5; 188/170; 188/264 E; 188/366; 192/83; 192/91 A
[51] Int. Cl.² ................................. F16D 65/16
[58] Field of Search ......... 188/71.5, 72/4, 170, 366, 188/72.3, 106 F, 264 E; 92/62, 63, 64; 192/91 A, 85 AA, 83

[56] References Cited
UNITED STATES PATENTS

| | | | |
|---|---|---|---|
| 2,928,504 | 3/1960 | Hahn et al. | 188/71.5 |
| 3,547,233 | 12/1970 | Girvan | 188/170 |
| 3,547,234 | 12/1970 | Cummins et al. | 188/170 |
| 3,613,839 | 10/1971 | MacDuff | 188/170 |
| 3,680,666 | 8/1972 | Sommer | 188/71.5 X |
| 3,770,085 | 11/1973 | Cottingham | 188/170 |

FOREIGN PATENTS OR APPLICATIONS 2,013,127  3/1970  France .................. 92/63

*Primary Examiner*—George E. A. Halvosa
*Attorney, Agent, or Firm*—Ralph E. Walters

[57] ABSTRACT

An annular dual piston brake arrangement for selective holding engagement of a rotatable member of a drive train includes an annular service brake piston axially reciprocably and nonrotatably mountably associated within a support structure, a fluid actuator for biasing it toward a brake holding position, an annular secondary brake piston axially reciprocably and nonrotatably mountably associated within the support structure in telescopingly compact, substantially radially aligned relation with respect to the service brake piston, a fluid retractor for holding the secondary brake piston in a disengaged condition away from the service brake piston and a plurality of engaging springs for biasing the secondary brake piston directly axially against the service brake piston in the absence of a predetermined pressure in the fluid retractor for brake holding engagement of the rotatable member.

10 Claims, 1 Drawing Figure

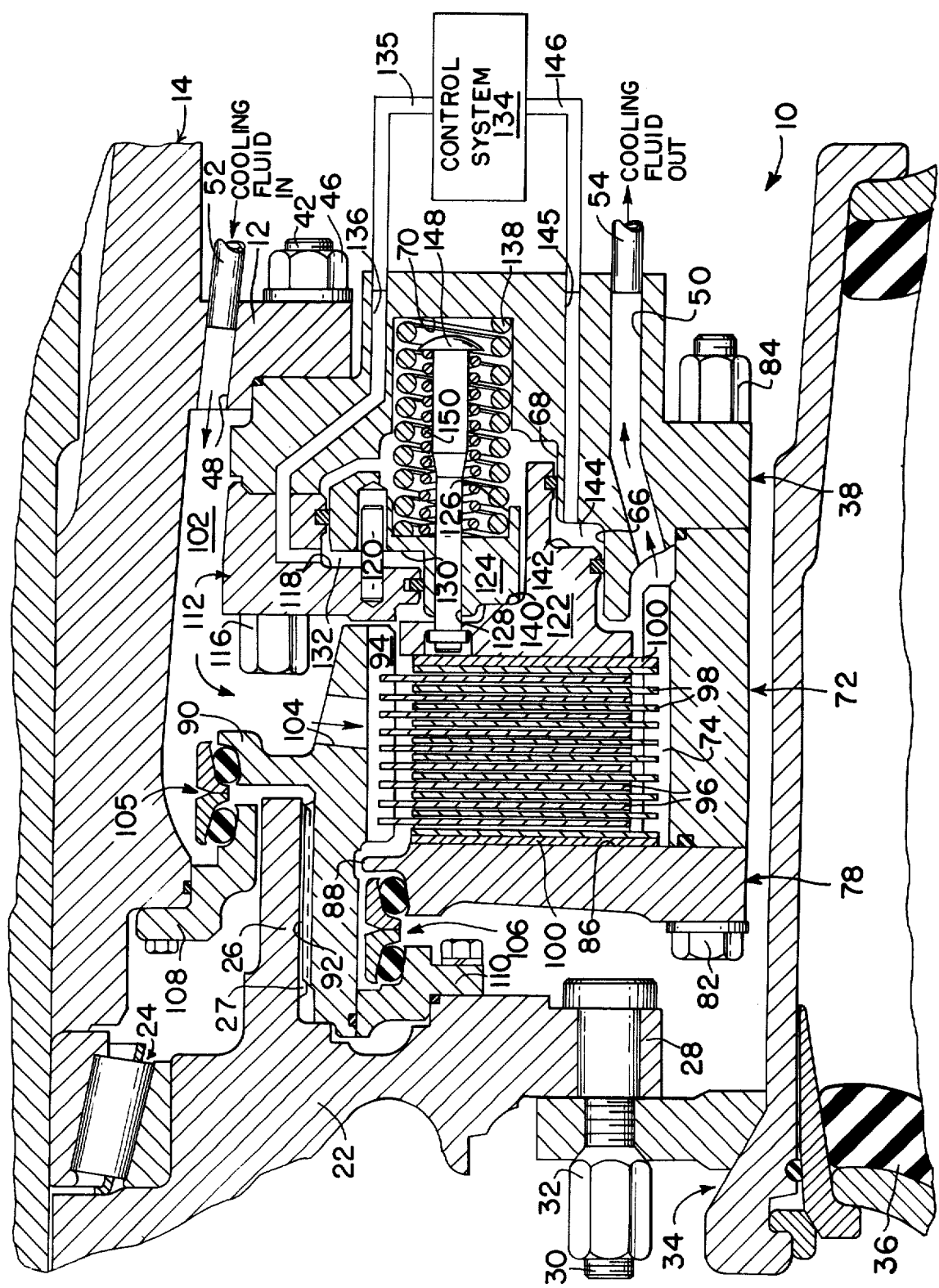

ANNULAR DUAL PISTON BRAKE ARRANGEMENT

BACKGROUND OF THE INVENTION

Fluid operated brake arrangements for large material hauling vehicles and the like are being continually improved in an attempt to achieve safe and effective braking under severe operating conditions. Representatives of these braking arrangements are the following U.S. Pat. Nos.:

2,928,504 issued Mar. 15, 1960 to E. H. Hahn et al
3,547,233 issued Dec. 15, 1970 to J. H. Girvan
3,547,234 issued Dec. 15, 1970 to C. F. Cummins et al
3,613,839 issued Oct. 19, 1971 to S. I. MacDuff
3,770,085 issued Nov. 6, 1973 to E. R. Cottingham However, as far as is known, such brake arrangements have not heretofore effectively integrated service braking with emergency braking and/or parking braking in a single annularly compact and economical package. For example, it is substantially imperative that these brake arrangements be small in size, while having a relatively high multi-purpose capacity, in order for them to fit within a wheel rim where space is at a premium. An additional desirable characteristic for such annular brake arrangements is the ability to easily install or remove them as a modular package.

While the aforementioned patents disclose the cooperating brake combination of a spring retracted, fluid engaged service brake piston with a normally fluid retracted, spring engaged parking brake piston, they are either limited in capacity by their spot type, caliper disc brake construction requiring a multiplicity of the units to be arranged around the member to be braked, or otherwise have extended axial or radial dimensions that are generally unacceptable for use in a relatively limited space.

Some of the other deficiencies of prior art brake arrangements include the lack of cooling oil supply to the energy-absorbing surfaces, and a slower than desired rate of response in fully applying the brakes because of the extended travel distance of the actuating pistons associated therewith.

SUMMARY AND OBJECTS OF THE INVENTION

Accordingly, it is an object of the present invention to provide an annular vehicle brake arrangement engagable for individual service braking as well as for emergency braking and/or parking braking in a relatively safe and responsive manner.

Another object is to provide a relatively high capacity brake arrangement of the character described which is both radially and axially compact so that it can be disposed annularly within a wheel rim of a vehicle.

Another object is to provide a brake arrangement of the aforementioned type which is fluid cooled in order to increase its energy absorption capability.

Other objects and advantages of the present invention, including the ability to easily install or remove the brake arrangement as a unitary package, will become more readily apparent upon reference to the accompanying drawings and the following description.

BRIEF DESCRIPTION OF THE DRAWING

The drawing is a fragmentary section of the annular dual piston brake arrangement of the present invention as taken through the axis of a vehicle axle housing and showing the lower half thereof including a portion of a wheel rim arrangement associated therewith.

DESCRIPTION OF PREFERRED EMBODIMENT

With reference to the drawing, the annular oil-cooled dual piston brake arrangement 10 of the present invention is axially mounted outboard of a radially extending flange 12 of a conically tapered axle housing 14 such as is found on a relatively large earthmoving truck or the like. A vehicle wheel hub 22 is rotatably supported on the axle housing to the outside, or to the left when viewing the drawing, of the annular brake arrangement by an anti-friction bearing 24. The wheel hub has an axially inwardly extending flange 26 with an external spline 27 thereon, and a radially outwardly extending flange 28 to which is secured a wheel rim arrangement generally identified by the reference numeral 34 by a plurality of circumferentially spaced lug bolts 30 and associated nuts 32. A tire 36 is sealingly mounted on the wheel rim arrangement and upon screwthreadably removing the nuts, the tire and wheel rim arrangement may be pulled outwardly as a unit from the lug bolts and the axle housing for servicing purposes in the usual manner.

The annular dual piston brake arrangement 10 includes an inner end plate 38 removably secured to the flange 12 of the axle housing 14 by a plurality of threaded studs 42 anchored to the end plate and extended axially inwardly through the flange for screwthreaded receipt of a plurality of retaining nuts 46 thereon. The mounting flange 12 has an inlet passage 48 therethrough, and the end plate has an outlet passage 50 therethrough which are respectively in communication with an inlet conduit 52 and an outlet conduit 54 for the purposes of normally continuously circulating a cooling fluid through the brake arrangement. Further, the end plate has an outer counterbore 66 and an inner counterbore 68 disposed in axially outwardly piston-receiving relation, and a plurality of circumferentially spaced spring-receiving cavities 70 opening on the inner counterbore.

The brake arrangement 10 also includes a centrally disposed cylindrical shell 72 having a plurality of internal teeth 74. The shell extends in spanning relation between the inner end plate 38 and an outer end plate 78, and in order to secure the shell and outer end plate to the inner end plate a plurality of elongated bolts 82 are inserted axially inwardly therethrough and are adapted to screwthreadably receive a corresponding plurality of retaining nuts 84 thereon. Thus, the outer end plate provides a relatively fixed inner thrust surface 86 for clamping engagement of the brake arrangement.

The outer end plate 78 has a circular aperture 88 defined centrally therethrough so that it may be disposed in relatively radially closely spaced relation to the external spline 27 of the wheel hub 22. However, a cylindrical connecting drum 90 still has enough clearance to extend axially outwardly through this aperture so that an internal spline 92 thereon is engaged with the external spline. Consequently, the connecting drum rotates with vehicle movement and is provided with a plurality of external teeth 94 on which are keyed a plurality of brake discs 96. These discs are interleaved with a plurality of brake plates 98 which are similarly keyed to the internal teeth 74 of the shell 72. A pair of damping plates 100 are also arranged at the opposite ends of the interleaved discs and plates in keyed engagement with the internal teeth 74 for the general purpose of minimizing braking squall in certain modes of operation of the braking arrangement 10.

Since the dual piston brake arrangement 10 is fully peripherally cooled by the circulation of fluid from the inlet conduit 52 to an internal chamber 102, and thence radially outwardly through a plurality of passages 104 in the connecting drum 90 and the interleaved brake discs 96 and brake plates 98, an annular internal seal arrangement 105 and an annular external seal arrangement 106 are required. The internal seal arrangement is generally disposed between an adapter member 108 secured to the axle housing 14 and the rotatable connecting drum 90, while the external seal arrangement is mounted between the outer end plate 78 and another adapter member 110 secured to the wheel hub 22. Such seal arrangements are generally disclosed in the aforementioned Cummins et al patent assigned to the assignee of the present invention.

The brake arrangement 10 also includes a parking brake housing 112 which is secured tightly against the inner end plate 38 and to the axle housing 14 by a plurality of retaining bolts 116 inserted therethrough for screwthreaded engagement with the end plate. The parking brake housing has an inwardly facing annular step 118 formed radially outwardly thereof with a piston retaining and aligning dowel 120 rigidly and axially inwardly extending therefrom.

More particularly, the actuation of the dual piston brake arrangement 10 of the present invention is accomplished by axial reciprocating movement of an annular service brake piston 112 and an annular secondary or parking brake piston 124 telescopically nested radially within it. The parking brake piston is normally disengaged, but is selectively or automatically actuated for either parking or emergency braking purposes as will hereinafter be described. The parking brake piston is axially reciprocably and nonrotatably secured to the parking brake housing 112 by the guiding and aligning dowel 120, and includes a plurality of spring-receiving cavities 126 opening inwardly thereof and a plurality of guide-receiving bores 128. The parking brake piston also includes an axially outwardly facing counterbore 130 which is disposed in axial slidable cooperating relation with the annular step 118 of the parking brake housing 112 to define a fluid retractor or sealed parking brake actuation chamber 132 therebetween. Fluid pressure is delivered to this chamber from a brake control system 134 through an interconnecting conduit 135 and an internal passage 136 to normally move the parking brake piston 124 axially inwardly, or to the right when viewing the drawing, against the opposition of a plurality of relatively high capacity compression springs 138 seated intermediate the cavities 70 and 126.

As mentioned generally above, the service brake piston 122 is arranged in telescopingly compact and radially aligned relation annularly outwardly of the parking brake piston 124. More particularly, it includes an axially inward open counterbore 140 adapted to closely receive the parking brake piston reciprocably therein. The service brake piston includes an inwardly facing annular step 142 which is disposed in axial slidable cooperating relation with the counterbores 66 and 68 of the inner end plate 38 so that a fluid actuator or sealed service brake actuation chamber 144 is defined therebetween. Fluid pressure is selectively delivered to, and limitedly relieved from, this actuating chamber through a communicating internal passage 145 and a conduit 146 leading to the brake control system 134. With pressurization of the service brake actuation chamber the service brake piston moves axially outwardly to compress the brake discs 96, brake plates 98, and damping plates 100 against the thrust surface 86 and frictionally against each other for selective holding engagement of the rotatable wheel hub 22. A plurality of shouldered guide pins 148 are removably secured to the service brake piston 122 and individually extend freely slidably through the bores 128 in the parking brake piston 124 to permit axial movement, while preventing relative rotation, therebetween. Each of these pins also guidably entraps a relatively light capacity retraction spring 150 thereon for the purpose of retracting the service piston.

OPERATION

While the operation of the present invention is believed clearly apparent from the foregoing description, further amplification will subsequently be made in the following brief summary of such operation. The annular dual piston brake arrangement 10 is shown with no fluid pressure present in either of the internal passages 136 or 145 leading to the service brake and parking brake actuation chambers 132 and 144, respectively. This corresponds to either a vehicle parking or an emergency braking condition, and in either of these conditions the control system 134 may operate selectively or automatically to relieve pressure from these chambers. Under such relieved circumstances the compression springs 138 apply a relatively substantial force through the axially outwardly extended parking brake piston 124 directly against the counterbore 140 of the service brake piston 122. This forces the service brake piston against the stack of interleaved brake discs 96, brake plates 98 and damping plates 100 to compress them as shown against the trust surface 86 of the outer end plate 78. In this way the discs are frictionally clamped to the axle housing 14, thereby also tending to hold the connecting drum 90, wheel hub 22 and the wheel rim arrangement 34 fixed. Any opposing force due to the relatively few and lightweight retraction springs 150 is easily overcome, resulting in a clamping force in the instant example of approximately 28,000 pounds. This is sufficient to hold a vehicle incorporating the present invention on an approximate 16 percent grade even though it is heavily loaded.

With vehicle movement, however, fluid pressure at approximately 400 psi is communicated from the control system 134 to the parking brake actuation chamber 132 to fully retract the parking brake piston 124 and thereby overcome the compression springs 138. In the absence of operating pressure in the service brake actuation chamber 144, the axially inward movement of the parking brake piston also serves to retract the service brake piston through the additionally axially compressed retraction springs 150. Thus, the two pistons are placed in a released condition.

Service braking is thereafter achieved through the selective delivery of fluid from the control system 134, the conduit 146, and the passage 145 to the service brake actuation chamber 144 at a pressure of up to approximately 600 psi in response to operator demand. This positions the service brake piston axially outwardly away from the retracted parking brake piston 124, and achieves a very effective maximum clamping force in the instant example of approximately 36,000 pounds.

The control system 134 allows only a predetermined volume of fluid to be exhausted from the service brake actuation chamber 144 upon the selective release of service braking. This permits limited retracting travel of the service brake piston 122 away from the previously tightly clamped brake discs 96, brake plates 98 and damping plates 100, and serves to automatically adjust any slack to beneficially improve service braking response upon the reengagement thereof. For example, the volume of fluid exhausted from the service brake actuation chamber is limited to an amount sufficient to provide approximately 0.005 inch clearance between each brake disc 96 and brake plate 98. This minimizes the drag and horsepower loss therebetween, while simultaneously limiting the maximum amount of service brake piston travel independently of any wear of the brake discs 96 and brake plates 98 so that rapid response can occur. Under these conditions the service piston is axially separated from the retracted parking brake piston.

Further, as set forth previously, fluid is continually circulated through the conduits 52 and 54 and substantially radially outwardly through the full periphery of the annular brake arrangement 10. This circulation of cooling fluid occurs at a rate of approximately 75 gpm, and is sufficient to establish a 20 psi pressure level in the internal chamber 102. This pressure acts on the service brake piston 122 and results in a substantial retracting force which supplements that of the retraction springs 150. Thus, the presence of this pressurized fluid beneficially results in decreasing the number of retraction springs 150 required.

In an emergency situation, the fluid pressure to the parking brake actuation chamber 132 may be selectively or automatically released by the control system 134 so that the compression springs 138 will bias the parking brake piston 124 abuttingly against the service brake piston 122 to compress the brake discs 96 and brake plates 98 against the thrust surface 86. Under this condition, pressure to the service brake actuation chamber 144 is normally exhausted, but if desired, pressure could be simultaneous supplied thereto through the passage 145 and the control system to supplement the spring force and to apply an increased clamping force for even more rapid braking of the vehicle. This could result in a maximized clamping force of approximately 64,000 pounds.

Thus, the annular dual piston brake arrangement 10 of the present invention can achieve service braking at a predetermined force corresponding to a maximum pressure in the service brake actuation chamber 144, parking braking or emergency braking at a force of approximately 75percent of this predetermined force, or emergency braking force of up to 175percent of this predetermined force.

Because of the compact modular construction of the dual piston brake arrangement 10, it is apparent that it may beneficially be preassembled before installation on the vehicle, and may be easily removed for servicing as a unit. For example, upon removing the wheel hub 22 and associated wheel rim arrangement 34 in the usual manner, it is thereafter only necessary to remove the adapter member 108 and the nuts 46 in order for the brake arrangement to be pulled axially outwardly from the flange 12 of the axle housing 14 as a unitary package. At this point the intimately engaged inner end plate 38, shell 72 and outer end plate 78 serve to contain the overlapping pistons 122 and 124, the interleaved brake discs 96 and brake plate 98, and the connecting drum 90 therewith, while the compression springs 138 simultaneously hold these components in an axially aligned clamped relation.

Therefore, the annular dual piston brake arrangements 10 of the present invention presents an extremely compact and effective multi-capacity, multi-purpose oil-cooled brake for a vehicle or the like. Maximum use of available space by telescopingly and overlappingly relating the annular service brake piston 122 and the annular secondary brake piston 124 is coupled with substantially axially coextending compression springs for selective high capacity braking. Such annular arrangement also affords a unitized package which is easy to install and service.

Fluid cooling of the annular dual piston brake arrangement 10 beneficially results in aiding retraction of the service brake piston 122 so that fewer retraction springs 150 are required. This generally reduces the force that must be overcome by the actuation pressure in the service brake actuation chamber 144 to provide a specific degree of service braking.

Additionally, the limited exhausting of fluid from the service brake actuation chamber 144 upon disengagement of the service brake piston 122 limits its maximum travel to improve the rate of service braking response upon its subsequent reengagement.

While the invention has been described and shown with particular reference to a single embodiment, it will be apparent that variations might be possible that would fall within the scope of the present invention, which is not intended to be limited except as defined in the following claims. The embodiments of the invention in which an exclusive property or privilege is claimed are defined as follows:

1. An annular dual piston brake arrangement for selective holding engagement of a rotatable member of a drive train, comprising;

a support structure;

an annular service brake piston axially reciprocably and nonrotatably mounted within said support structure;

fluid actuating means for biasing said annular service brake piston concentrically toward a brake holding position with respect to such rotatable member;

an annular secondary brake piston axially reciprocably and nonrotatably mounted within said support structure in axially telescoping, substantially radially aligned compact relation within said service brake piston;

fluid retracting means for holding said secondary brake piston in a disengaged condition, limitedly axially separated from said service brake piston; and spring engagement means for biasing said secondary brake piston directly axially against said service brake piston for subsequent peripheral brake holding engagement of said rotatable member in the absence of a predetermined pressure in said fluid retraction means.

2. The annular dual piston brake arrangement of claim 1 including seal means disposed intermediate said support structure and said rotatable member to thereby define an internal chamber therebetween, and fluid circulating means for delivering fluid in a fluid path radially outwardly through said internal chamber in order fully peripherally to cool the annular brake arrangement, said fluid also serving to aid in retracting said service brake piston.

3. The annular dual piston brake arrangement of claim 2 wherein said support structure includes a thrust surface thereon and a plurality of internal teeth on which are keyed a plurality of annular plates, and said rotatable member includes a plurality of external teeth on which are keyed a plurality of annular discs interleaved with said plates, said discs and plates being biased together and against said thrust surface upon axial movement of said service brake piston toward the brake holding position and being disposed in said fluid path.

4. The annular dual piston brake arrangement of claim 1 including retracting spring means for axially disengaging said service brake piston from said rotatable member in the absence of a predetermined pressure in said fluid actuating means.

5. The annular dual piston brake arrangement of claim 4 wherein said fluid actuating means includes a service brake actuation chamber defined between said support structure and said service brake piston, and a control system therefor permitting a predetermined volume of fluid to be exhausted from said chamber upon the selctive release of said service brake piston away from a brake holding position to thereby limit its maximum amount of travel and improve its reengagement response.

6. The annular dual piston brake arrangement of claim 4 including alignment means for establishing an axial free sliding nonrotating relation between said support structure and said secondary brake piston, and wherein said support structure has a plurality of cavities therein and said secondary brake piston has a corresponding plurality of opposing cavities therein, and said spring engagement means includes a plurality of compression springs individually seated within each of said aligned cavities.

7. The annular dual piston brake arrangement of claim 6 including guide pin means intermediate said secondary brake piston and said service brake piston for establishing axial free sliding and nonrotating cooperation therebetween.

8. The annular dual piston brake arrangement of claim 7 wherein said secondary brake piston includes a plurality of axial bores therethrough concentric with a limited number of said cavities, and said guide pin means includes a plurality of shouldered guide pins secured to said service brake piston and extending through said bores, and said retracting spring means includes a plurality of retracting compression springs individually mounted on said shouldered guide pins.

9. The annular dual piston brake arrangement of claim 8 wherein said service brake piston includes an axially inwardly open counterbore adapted to closely receive said secondary brake piston reciprocably therein, said secondary brake piston adaptable for relatively limited axial movement between an abutting position with said counterbore to a retracted position axially spaced away from said counterbore and serving to additionally axially compress said retracting compression springs.

10. An annular dual piston brake arrangement for use with a wheel of a vehicle, comprising;
   a support structure nonrotatably secured to the vehicle;
   a rotatable member operatively associated with such wheel;
   a stacked plurality of annular braking plates assembled so that alternate ones thereof are respectively connected to said rotatable member and said support structure;
   an annular service brake piston axially reciprocably and nonrotatably mounted within said support structure;
   fluid actuating means for axially biasing said annular service brake piston concentrically into peripheral engagement with said stacked plurality of annular braking plates for effecting brake holding engagement of said rotatable member and said wheel;
   an annular secondary brake piston axially reciprocably and nonrotatably mounted within said support structure and so constructed and arranged that said secondary brake piston and said service brake piston are nestably disposable in radially overlapping axial force transmitting contact;
   fluid retracting means for holding said secondary brake piston in a disengaged condition, limitedly axially separated from said service brake piston; and
   spring means for biasing said secondary brake piston directly axially against said service brake piston for subsequent brake holding engagement of said rotatable member in the absence of a predetermined pressure in said fluid retraction means.

* * * * *